United States Patent
Akimoto et al.

(10) Patent No.: US 7,239,754 B2
(45) Date of Patent: Jul. 3, 2007

(54) METHOD, APPARATUS AND SYSTEM FOR COMPRESSING STILL IMAGES IN MULTIPURPOSE COMPRESSION SYSTEMS

(75) Inventors: Hiroshi Akimoto, 26,Kitayacho, Nakahara-ku, Kawasaki-shi, Kanagawa-ken, 211-0015 (JP); Igor V. Matulyak, 23-1 Tajiricho, Nakahara-Ku, Kawasaki-shi, Kanagawa-ken (JP) 211-0015; Volodymyr V. Moroz, 23-1 Tajiricho, Nakahara-Ku, Kawasaki-shi, Kanagawa-ken (JP) 211-0015

(73) Assignees: Hiroshi Akimoto (JP); Igor V. Matulyak (JP); Volodymyr V. Moroz (JP)

( * ) Notice: Subject to any disclaimer, the term of this patent is extended or adjusted under 35 U.S.C. 154(b) by 898 days.

(21) Appl. No.: 10/620,873

(22) Filed: Jul. 15, 2003

(65) Prior Publication Data
US 2004/0013313 A1 Jan. 22, 2004

Related U.S. Application Data

(60) Provisional application No. 60/396,380, filed on Jul. 16, 2002.

(51) Int. Cl.
*G06K 9/36* (2006.01)
(52) U.S. Cl. ............... 382/240; 382/166; 382/245; 382/246; 375/240.19
(58) Field of Classification Search ........... 382/240, 382/166
See application file for complete search history.

(56) References Cited

U.S. PATENT DOCUMENTS

| | | | | |
|---|---|---|---|---|
| 4,207,599 A | * | 6/1980 | Murayama et al. | 341/63 |
| 5,329,360 A | * | 7/1994 | Gillard et al. | 348/472 |
| 5,426,465 A | * | 6/1995 | Drewery | 348/427.1 |
| 5,495,292 A | * | 2/1996 | Zhang et al. | 375/240.02 |
| 5,552,832 A | * | 9/1996 | Astle | 375/240.24 |
| 5,561,463 A | * | 10/1996 | Thomas et al. | 348/392.1 |
| 5,699,457 A | * | 12/1997 | Adar et al. | 382/239 |
| 5,740,277 A | * | 4/1998 | Katto | 382/232 |

(Continued)

OTHER PUBLICATIONS

1. Mallat Stephane G., "A Theory for Multiresolution Signal Decomposition: The Wavelet Representation", IEEE Transactions on Pattern Analysis and Machine Intelligence, vol. 11, No. 7, Jul. 1989. 2. "JPEG 2000 Image Coding System", JPEG 2000 Final Committee Draft Version 1.0, Mar. 16, 2000. 3. J.M. Shapiro, "Embedded Image coding using zerotrees of wavelet coefficients", IEEE Trans. on Signal Processing, v.41, No. 12, pp. 3445-3463, Dec. 1993.

(Continued)

*Primary Examiner*—Matthew C. Bella
*Assistant Examiner*—Sath V. Perungavoor
(74) *Attorney, Agent, or Firm*—David L. Garrison; Garrison & Associates PS

(57) ABSTRACT

The present invention teaches a method of compressing still images in a multi-purpose compression system. The current invention teaches preprocessing of the images to a YUV 4:2:0 format and decomposing the images using two-dimensional Discrete Wavelet Transformation. The current invention teaches that filters may be selected based on image dimensions. After the image is decomposed, the frequency coefficients are quantized and the data is entropy encoded. The image is restored by reversing the compression process.

1 Claim, 6 Drawing Sheets

U AND V COMBINING

PASS FOR UV
Pass example is shown for 3 and 5 frequency block

U.S. PATENT DOCUMENTS

| | | | | |
|---|---|---|---|---|
| 5,748,786 A | * | 5/1998 | Zandi et al. | 382/240 |
| 5,754,702 A | * | 5/1998 | Simpson | 382/240 |
| 5,764,805 A | * | 6/1998 | Martucci et al. | 382/238 |
| 5,768,427 A | * | 6/1998 | Pan et al. | 382/232 |
| 5,808,683 A | * | 9/1998 | Tong et al. | 375/240.11 |
| 5,819,035 A | * | 10/1998 | Devaney et al. | 709/202 |
| 5,819,215 A | * | 10/1998 | Dobson et al. | 704/230 |
| 5,821,986 A | * | 10/1998 | Yuan et al. | 348/14.12 |
| 5,880,856 A | * | 3/1999 | Ferriere | 358/426.11 |
| 5,900,861 A | * | 5/1999 | Nickerson et al. | 345/601 |
| 5,923,785 A | * | 7/1999 | Dube | 382/240 |
| 5,974,184 A | * | 10/1999 | Eifrig et al. | 382/236 |
| 5,982,434 A | * | 11/1999 | Tong et al. | 375/240.11 |
| 6,005,678 A | * | 12/1999 | Higashida et al. | 358/452 |
| 6,031,937 A | | 2/2000 | Graffagnino | |
| 6,052,149 A | * | 4/2000 | Barnaby | 375/240.24 |
| 6,052,157 A | * | 4/2000 | Weihs | 348/663 |
| 6,055,017 A | * | 4/2000 | Shen et al. | 375/240.11 |
| 6,067,383 A | * | 5/2000 | Taniguchi et al. | 382/240 |
| 6,091,777 A | * | 7/2000 | Guetz et al. | 375/240.11 |
| 6,118,902 A | | 9/2000 | Knowles | |
| 6,205,181 B1 | * | 3/2001 | Hu et al. | 375/240.26 |
| 6,233,358 B1 | | 5/2001 | Acharya | |
| 6,259,819 B1 | * | 7/2001 | Andrew et al. | 382/248 |
| 6,289,131 B1 | * | 9/2001 | Ishikawa | 382/240 |
| 6,339,658 B1 | | 1/2002 | Moccagatta et al. | |
| 6,356,276 B1 | * | 3/2002 | Acharya | 345/600 |
| 6,388,588 B2 | * | 5/2002 | Kitamura | 341/67 |
| 6,389,160 B1 | * | 5/2002 | Chui et al. | 382/166 |
| 6,459,454 B1 | * | 10/2002 | Walters | 348/448 |
| 6,674,479 B2 | * | 1/2004 | Cook et al. | 348/453 |
| 6,701,027 B1 | * | 3/2004 | Ernst | 382/275 |
| 6,819,800 B2 | * | 11/2004 | Jung et al. | 382/240 |
| 6,825,876 B1 | * | 11/2004 | Easwar et al. | 348/234 |
| 6,847,468 B2 | * | 1/2005 | Ferriere | 358/1.2 |
| 7,002,627 B1 | * | 2/2006 | Raffy et al. | 348/273 |
| 7,076,108 B2 | * | 7/2006 | Huang et al. | 382/240 |
| 7,139,022 B1 | * | 11/2006 | Raffy | 348/273 |
| 7,154,557 B2 | * | 12/2006 | Itoh et al. | 348/453 |
| 7,177,478 B2 | * | 2/2007 | Ville et al. | 382/245 |
| 2001/0003544 A1 | * | 6/2001 | Kajiwara et al. | 382/240 |
| 2002/0057736 A1 | * | 5/2002 | FUJI et al. | 375/240 |
| 2002/0131505 A1 | * | 9/2002 | Vidunas | 375/240.19 |
| 2003/0026477 A1 | * | 2/2003 | Ishiga | 382/166 |
| 2003/0108248 A1 | * | 6/2003 | Huang et al. | 382/240 |

OTHER PUBLICATIONS

4. Vetterli, M., Herley, C., "Wavelets and Filter Banks: Relationships and New Results", Department of Electric Engineering and Center for Telecommunication Research, Columbia University, New York, pp. 1723-1726, 1990 5. Daubechies, Ingrid, "Ten Lectures on Wavelets", Society for Industrial and Applied Mathematics, 1992.

* cited by examiner

FIG.1

U AND V COMBINING

FIG.2

One-dimensional Wavelet Transform for Y- component

ONE-DIMENSIONAL WAVELET TRANSFORM (THE SECOND STEP)

ENUMERATION FOR Y

FIG.5

Enumeration for UV

FIG.6

PASS FOR Y

PASS EXAMPLE IS SHOWN FOR 4 AND 2 FREQUENCY BLOCKS

FIG.7

PASS FOR UV

Pass example is shown for 3 and 5 frequency block

FIG.8

Figure 8. *Shift_Array* Forming

METHOD, APPARATUS AND SYSTEM FOR COMPRESSING STILL IMAGES IN MULTIPURPOSE COMPRESSION SYSTEMS

CROSS-REFERENCE TO RELATED APPLICATION

This application claims benefit from U.S. Provisional Patent Application No. 60/396,380, filed Jul. 16, 2002, entitled "Method Apparatus and System for Compressing Still Image in Multipurpose Compression System."

FIELD OF THE INVENTION

The present invention relates to devices for the processing of images, and in particular for the compression of static images to a high degree and the obtaining of a restored image of high image quality. More specifically, the present invention teaches a method of pre-processing an image, decomposition of the image using wavelet transform, and quantizing the frequency coefficients such that images can be compressed to a high degree and be restored with minimal information loss.

BACKGROUND OF THE INVENTION

Still images are an effective means for describing various subjects. Information about the subject is accumulated in image databases. At the present time a great multitude of types of databases have been developed that are oriented to the applications of special methods of analysis and information processing.

Current digital transmitting systems have a number of advantages for image processing in comparison with analog systems. Recently developed techniques have led to improved methods to reduce image size. Such methods are extremely useful for digital data storing and processing or manipulating. So it may be said that data size reduction is a compression process. As to the architecture, it is possible now to put a complete compression process into a single chip. The main objective of a compression process is to achieve the highest compression ratio and in the same time to provide the minimum data loss that may lead to decompressed image quality degradation.

SUMMARY OF THE INVENTION

Systems for encoding and decoding still image of various dimensions currently exist. The methods described herein can be applied in these systems, and they may be used for Intra frame encoding as well. The current invention teaches encoding images in the following steps:
1. Image preprocessing (switch to original format),
2. Image decomposition by the wavelet transform according to features described herein (frequency block enumeration etc.),
3. Quantizing frequency coefficients using schemes described in detail herein, and
4. Restoring the image by performing the steps in reverse.

The method of the current invention has some significant features, which are extremely important for image processing and which can really improve restored image quality and raise the compression ratio relative to methods currently used. It has been found that compression using the method of the current invention yeilds results higher than well-known worldwide standards (such as JPEG2000). Comparative data is in Tables 1, 2, 3 below shows PSNR values for JPEG2000 and the method taught by this application.

The method taught herein allows the original image to be formatted during preprocessing, and the image decomposition and frequency coefficient quantizing taught herein allows the compression ration to be increased relative to currently known methods.

TABLE 1

|  | Horse | Landscape |
| --- | --- | --- |
| JPEG2000 | 31.72 | 25.03 |
| Given method | 31.67 | 26.43 |

TABLE 2

|  | Fish | Squirrel |
| --- | --- | --- |
| JPEG2000 | 35.79 | 29.61 |
| Given method | 35.789 | 30.17 |

TABLE 3

|  | Robot |
| --- | --- |
| JPEG2000 | 32.06 |
| Given method | 33.236 |

DETAILED DESCRIPTION OF THE INVENTION

The method of the current invention is executed according to the following steps:

Step 1: An image in RGB format is converted into an in image in YUV 4:4:4 format. Shown below is an example of four neighboring pixels in that format having different values for Y, U, and V.

| $Y_1 U_1 V_1$ | $Y_2 U_2 V_2$ |
| --- | --- |
| $Y_3 U_3 V_3$ | $Y_4 U_4 V_4$ |

Step 2: The image in YUV 4:4:4 is converted into an image in YUV 4:2:0.

Figure 1:
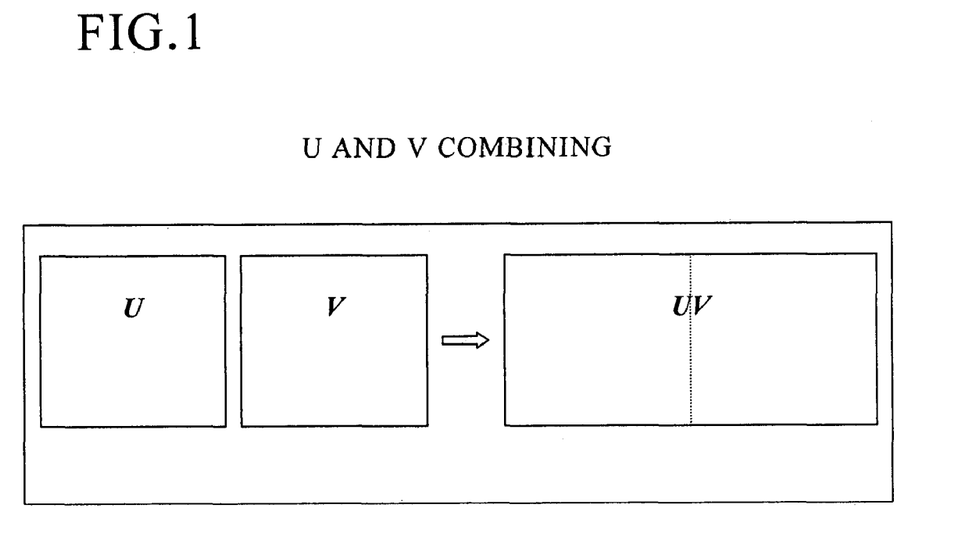
FIG. 1 illustrates the joining of the U and V color planes together into a single plane.

Step 3: The U and V color planes are combined as illustrated in FIG. 1.

Figure 2:
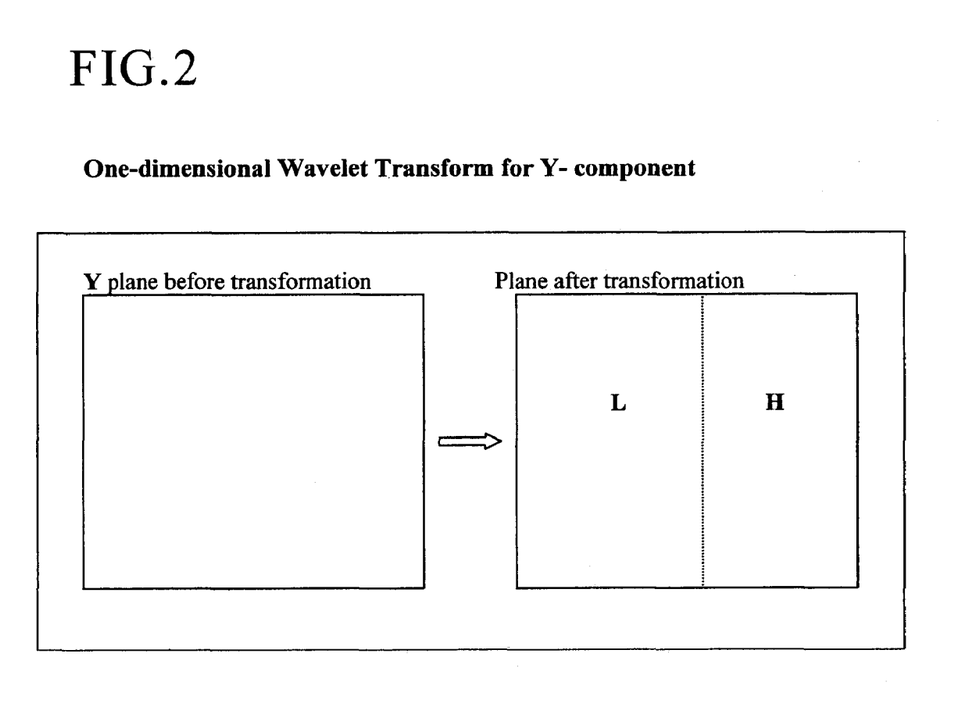
FIG. 2 illustrates the Y plane after the first one-dimensional wavelet transform has been executed.
Figure 5:
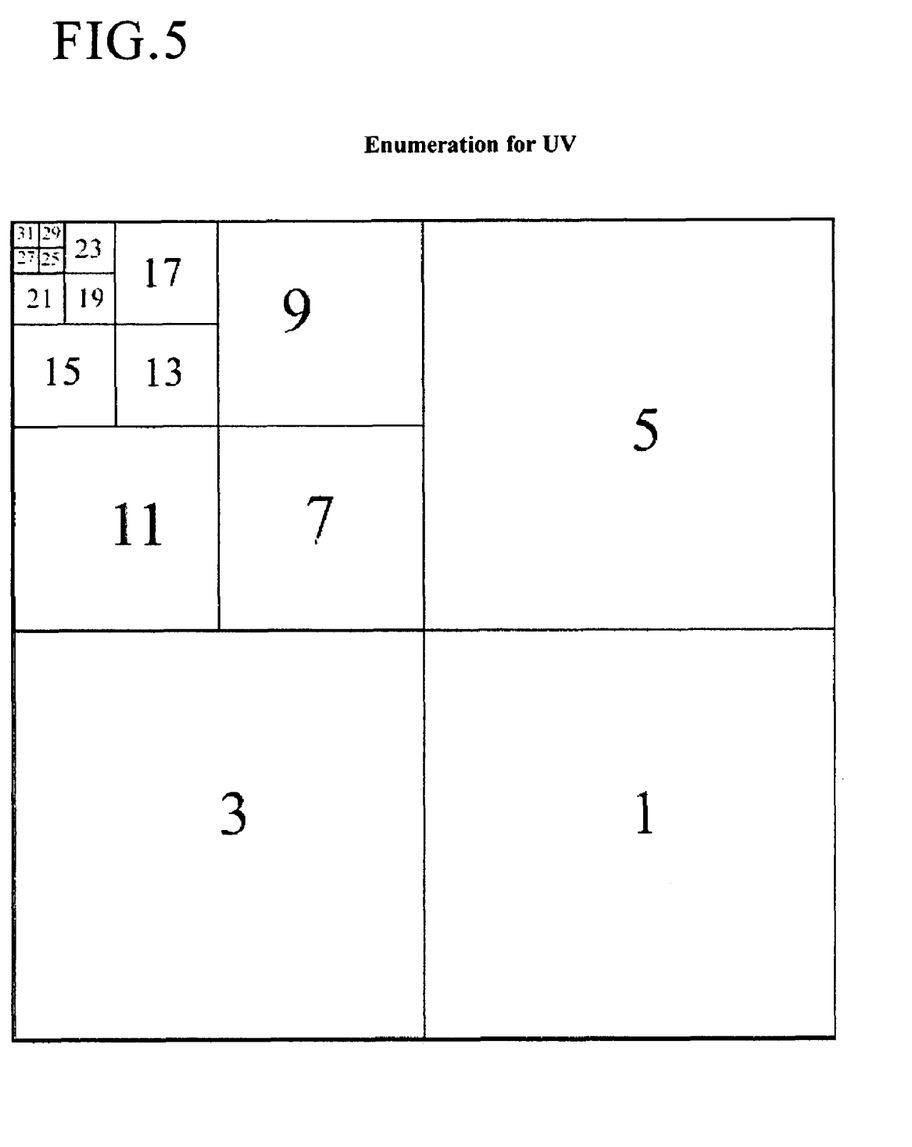
FIG. 5 illustrates the enumeration of the combined UV plane.

Step 4: A one-dimensional Discrete Wavelet Transform is then executed for every line of the Y plane. After the transform is executed, two blocks, with multiple rows and columns are formed such that on block (L) is for low frequencies and the other block (H) is for high frequencies (FIG. 2).

subsequent LL block until five levels of Two-dimensional Wavelet Transform have been executed as shown in FIG. 5.

The significant aspect of the current invention is that it is possible to select a filter according to image dimensions. For the SIF format a 22/14 filter is used, and for the R601 format a 5/3 filter is used. Filtering coefficients are shown in Table 4 below.

TABLE 4

Filtering coefficients.

| 22/14 | | 5/3 | |
|---|---|---|---|
| G | H | G | H |
| 0.730018808 | | −1.7677669529e−01 | |
| 0.078814418 | | 3.5355339059e−01 | 3.5355339059e−01 |
| −0.142800426 | | 1.0606601717e+00 | 7.0710678118e−01 |
| 0.018097252 | | 3.5355339059e−01 | 3.5355339059e−01 |
| 0.036833941 | 0.648022975 | −1.7677669529e−01 | |
| −0.0093268515 | 0.162005743 | | |
| −0.0065812408 | −0.097203451 | | |
| 0.001207186 | −0.02777241 | | |
| 0.000975453 | 0.021600768 | | |
| −0.000071375 | 0.0029456 | | |
| −0.00006039 | −0.002492395 | | |
| −0.00006039 | −0.002492395 | | |
| −0.000071375 | 0.0029456 | | |
| 0.000975453 | 0.021600768 | | |
| 0.001207186 | −0.02777241 | | |
| −0.0065812408 | −0.097203451 | | |
| −0.0093268515 | 0.162005743 | | |
| 0.036833941 | 0.648022975 | | |
| 0.018097252 | | | |
| −0.142800426 | | | |
| 0.078814418 | | | |
| 0.730018808 | | | |

Figure 3:
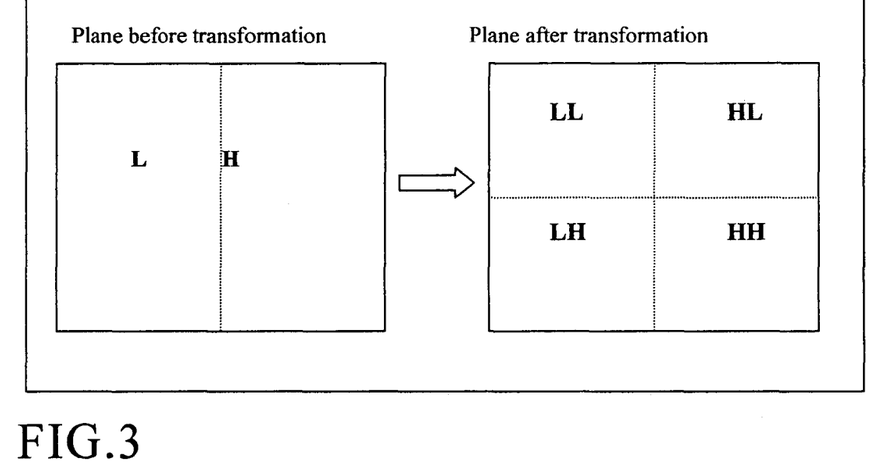
FIG. 3 illustrates the Y plane after the second one-dimensional wavelet transform has been executed.

Step 5: A one-dimensional Discrete Wavelet Transform is then executed for every column of the obtained plane. It is the second step of Discrete Wavelet Transform. Referring to FIG. 3, after the transform is executed, 4 blocks are formed as follows: (LL) low frequency across and up, (LH) low frequency across and high frequency up, (HL) high-frequency across and low-frequency up, (HH) high-frequency across and high-frequency up.

Figure 4:
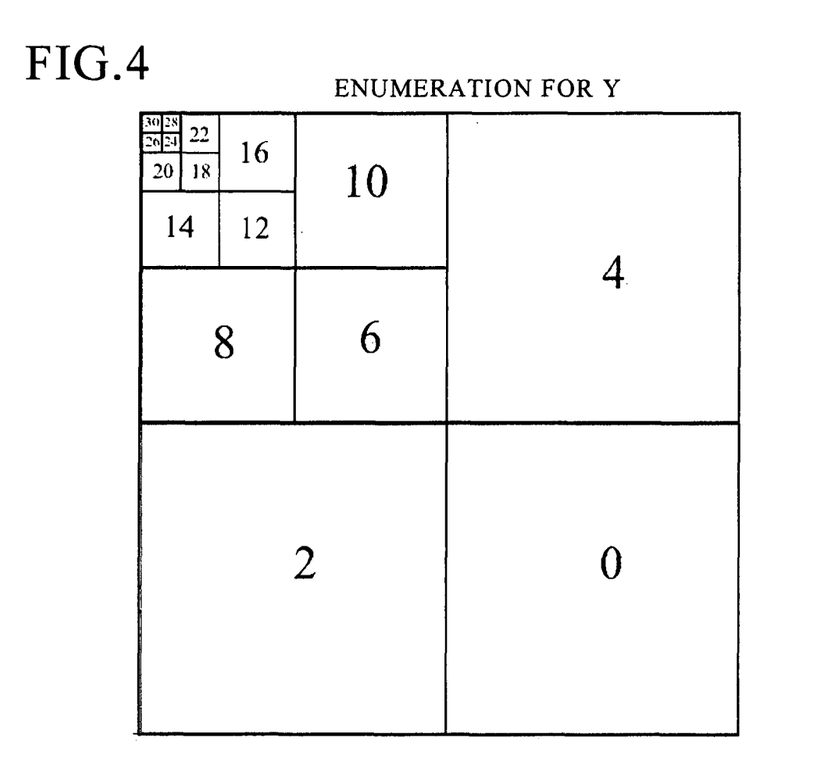
FIG. 4 illustrates the enumeration of the Y plane.

At this stage the first level of two-dimensional Wavelet Transform is complete. A two-dimensional Discrete Wavelet Transform is then executed for the LL block and for each subsequent LL block until five levels of Two-dimensional Wavelet Transform have been executed as shown in FIG. 4.

Step 6: A one-dimensional Discrete Wavelet Transform is then executed for every line of the UV plane. After the transform is executed, two blocks having multiple rows and columns are formed such that on block (L) is for low frequencies and the other block (H) is for high frequencies (FIG. 2).

Step 7: A one-dimensional Discrete Wavelet Transform is then executed for every column of the obtained plane. It is the second step of Discrete Wavelet Transform. Referring to FIG. 3, after the transform is executed, 4 blocks are formed as follows: (LL) low frequency across and up, (LH) low frequency across and high frequency up, (HL) high-frequency across and low-frequency up, (HH) high-frequency across and high-frequency up.

Figure 6:
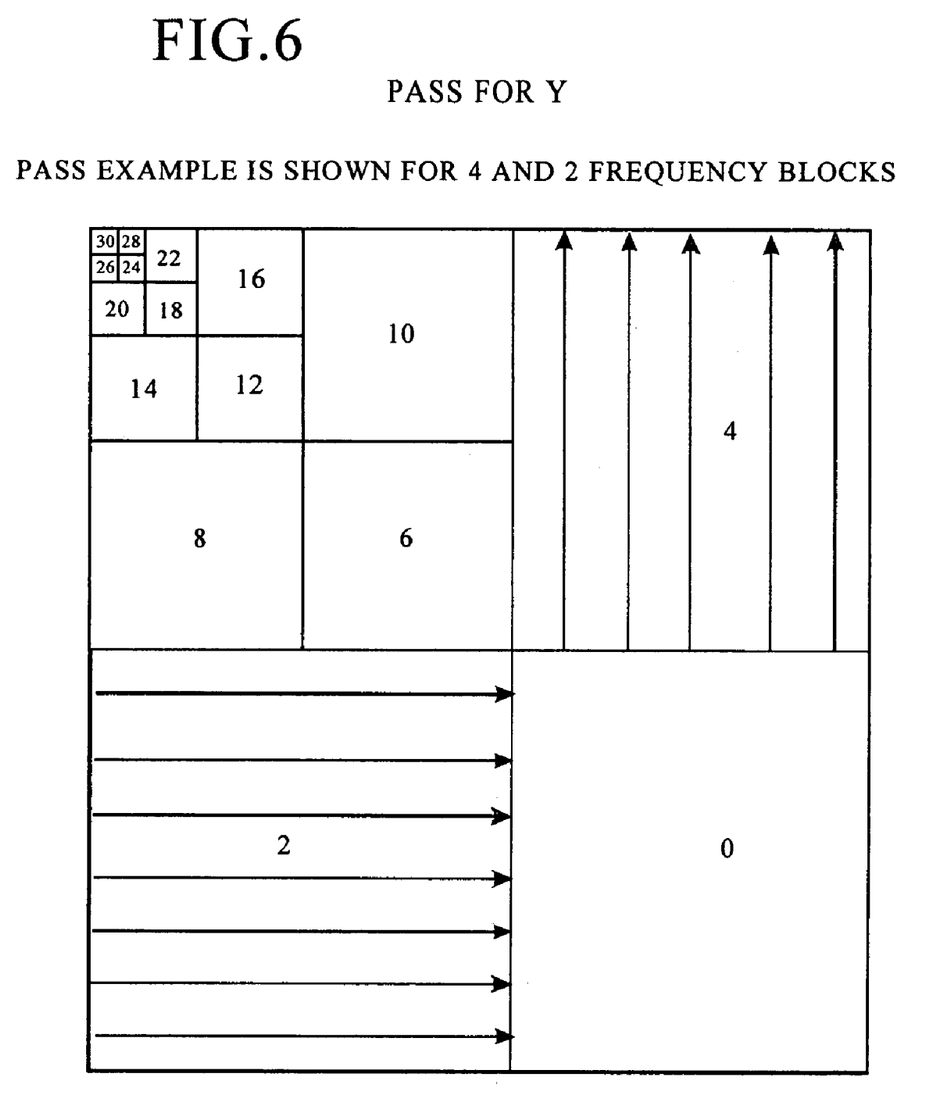
FIG. 6 is an example of a pass for quantizing the frequency coefficients in the Y plane.
Figure 7:
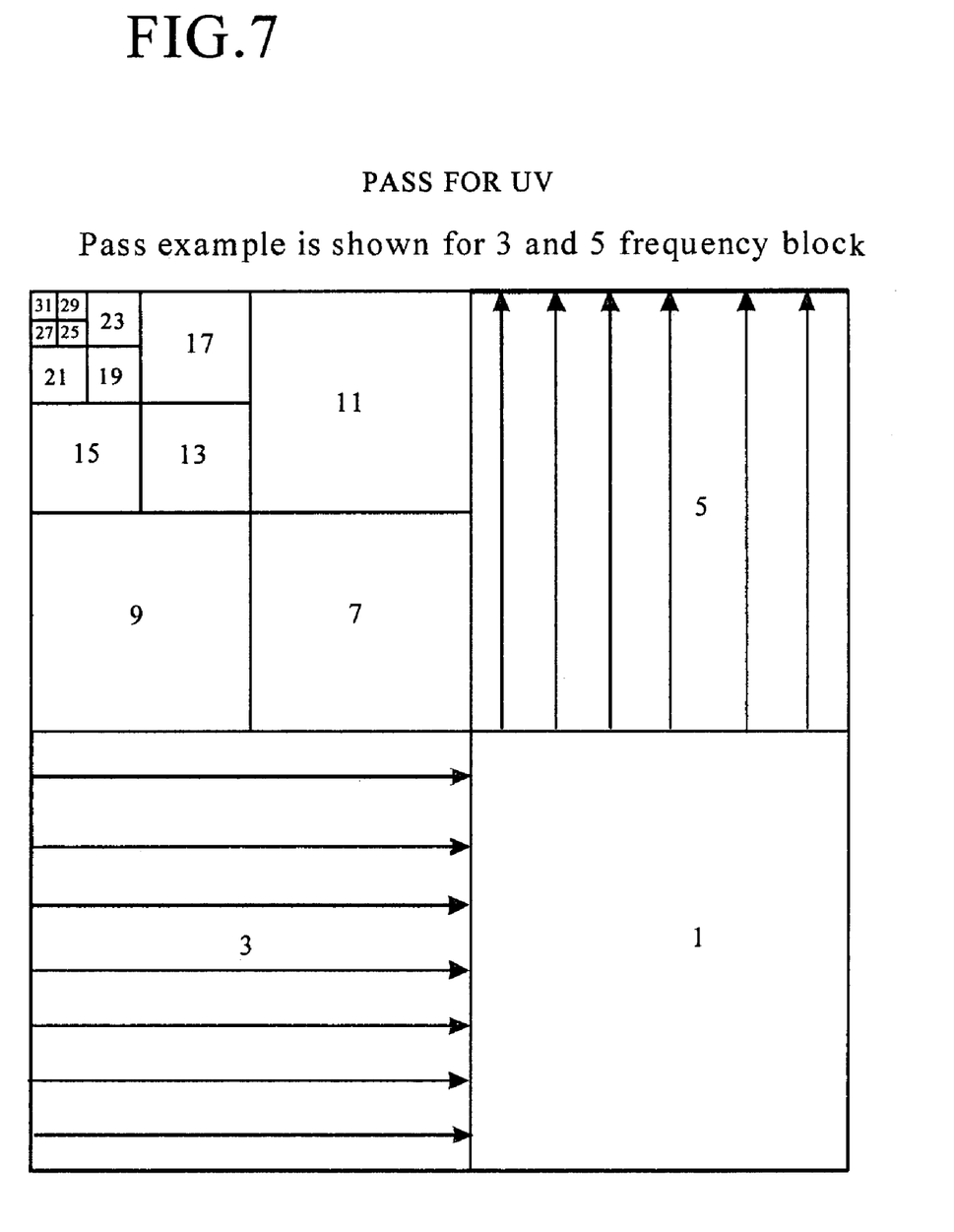
FIG. 7 is an example of a pass for quantizing the frequency coefficients in the combined UV plane.

At this stage the first level of two-dimensional Wavelet Transform is complete. A two-dimensional Discrete Wavelet Transform is then executed for the LL block and for each Step 8: After five levels of DWT have been executed, the frequency blocks are enumerated as shown in FIGS. 4 and 5. Vertical passes for the frequency coefficients are then executed on the following blocks in order: 2, 3, 8, 9, 14, 15, 20, 21, 26, and 27. Horizontal passes are executed on the remaining blocks. Such passes allow for effective quantization, and examples are shown in FIGS. 6 and 7.

Step 9: Every frequency coefficient is quantized as follows:

$$\Delta_i = q_i \cdot (20 + 0.5 \cdot bpp), i=0, \ldots, 31.$$

Where: i is the number of a frequency block, $q_i$ is a value from Table 5 or Table 6 chosen according to i, and bpp is a parameter which is set in dependence of the compression ration 0<bpp<255.

TABLE 5

Serial number of the frequency block
(even numbers - Y frequency blocks)

| i | Corresponding value $q_i$ |
|---|---|
| 0 | 0.040000 |
| 2 | 0.056568 |
| 4 | 0.056568 |
| 6 | 0.080000 |
| 8 | 0.113137 |
| 10 | 0.113137 |
| 12 | 0.160000 |
| 14 | 0.226274 |
| 16 | 0.226274 |
| 18 | 0.320000 |
| 20 | 0.452544 |

TABLE 5-continued

| Serial number of the frequency block (even numbers - Y frequency blocks) i | Corresponding value $q_i$ |
|---|---|
| 22 | 0.452544 |
| 24 | 0.640000 |
| 26 | 0.905097 |
| 28 | 0.905097 |
| 30 | 1.280000 |

TABLE 6

| Serial number of the frequency block (odd numbers - UV frequency blocks) i | Corresponding value $q_i$ |
|---|---|
| 1 | 0.000100 |
| 3 | 0.000100 |
| 5 | 0.000100 |
| 7 | 0.080000 |
| 9 | 0.113137 |
| 11 | 0.113137 |
| 13 | 0.160000 |
| 15 | 0.226274 |
| 17 | 0.226274 |
| 19 | 0.320000 |
| 21 | 0.452544 |
| 23 | 0.452544 |
| 25 | 0.640000 |
| 27 | 0.905097 |
| 29 | 0.905097 |
| 31 | 1.280000 |

Step 9.1: Every coefficient is multiplied by $\Delta_i$.

if $\Delta_i \cdot \max(f_i) > 63$ or if $\Delta_i \cdot \min(f)_i < -63$ so $\Delta_i$ is corrected to satisfy following conditions:

$\Delta_i \cdot \max(f_i) < 63$ $\Delta_i \cdot \min(f)_i > -63$.

Step 9.2: The obtained values are rounded to the closest integer value and recorded in one-dimensional array according to the order of the vertical and horizontal passes.

Step 10: The sequence of coefficients is quantized by the modified RLE method such that two arrays, a Data Array and Length Array, are obtained.

Step 11: Values are read from the Data Array and replaced by the corresponding value from Table 7 below.

TABLE 7

| Replaced values. | |
|---|---|
| Three-byte replaced values | One-byte replacing values |
| 0xc140bf | 0x01 |
| 0xbf40c1 | 0x02 |
| 0xc140c1 | 0x03 |
| 0xbf40bf | 0x04 |
| 0xc1c0c0 | 0x05 |
| 0xc0c0bf | 0x06 |
| 0xc0c0c1 | 0x07 |
| 0xbfc0c0 | 0x08 |
| 0xc1c0bf | 0x09 |
| 0xc1c0c1 | 0x0a |
| 0xbfc0c1 | 0x0b |

TABLE 7-continued

| Replaced values. | |
|---|---|
| Three-byte replaced values | One-byte replacing values |
| 0xbfc0bf | 0x0c |
| 0xbfc1bf | 0x0d |
| 0xc1bfc1 | 0x0e |
| 0x400040 | 0x0f |

Step 11.1: If a replacement value cannot be found in Table 7, a one-element shift is executed and Table 7 is rechecked for a replacement value.

Figure 8:
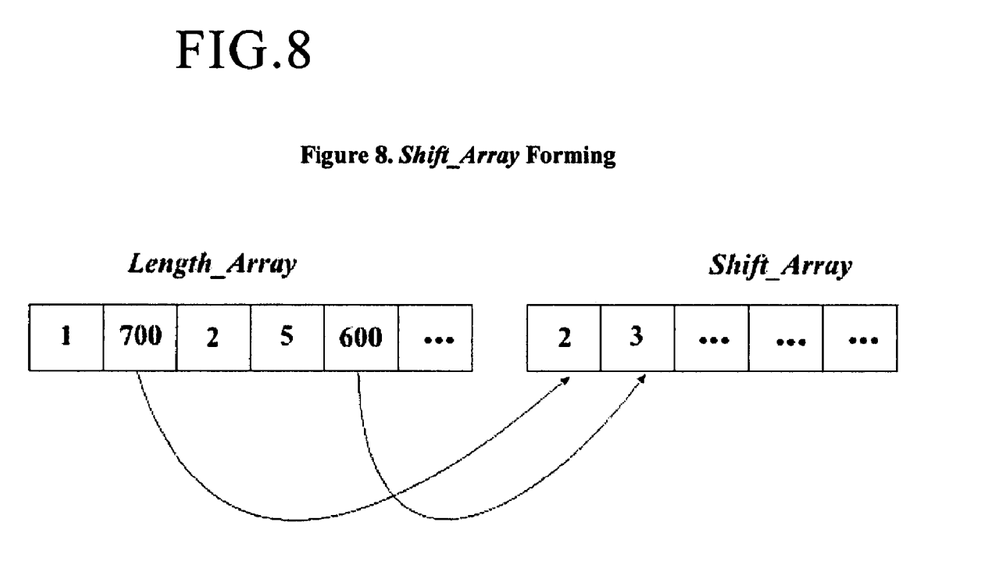
FIG. 8 illustrates the construction of the Shift Array.

Step 12: The relative displacement for values in the Length Array that are higher than 225 are placed in an additional array (Shift Array) we write the relative displacement for the values from Length Array which are higher than 255. The Shift Array is shown in FIG. 8 and its formation is discussed below.

The element with the highest value above 255 is located and its displacement relative to the first element of the Length Array is recorded in the shift array. The displacement, relative to the previous high value element, of remaining elements with values higher than 255 are then recorded in the Shift Array in order of the value.

Step 13: The Shift array is written to the end of the Length Array.

Step 14: The Length Array and Data Array values are then encoded by entropy encoding methods.

For block numbers 30 and 31 the forgoing steps are not applied. Instead, these blocks are simply entropy encoded if this is reasonable.

Step 15: The image is restored by reversing the steps above. Three byte restoration values are shown in Table 8 .

TABLE 8

| Replacing values. | |
|---|---|
| One-byte replaced values | Three-byte replacing values |
| 0x01 | 0xc140bf |
| 0x02 | 0xbf40c1 |
| 0x03 | 0xc140c1 |
| 0x04 | 0xbf40bf |
| 0x05 | 0xc1c0c0 |
| 0x06 | 0xc0c0bf |
| 0x07 | 0xc0c0c1 |
| 0x08 | 0xbfc0c0 |
| 0x09 | 0xc1c0bf |
| 0x0a | 0xc1c0c1 |
| 0x0b | 0xbfc0c1 |
| 0x0c | 0xbfc0bf |
| 0x0d | 0xbfc1bf |
| 0x0e | 0xc1bfc1 |
| 0x0f | 0x400040 |

The current invention discloses methods and procedures for compressing still images in multi-purpose compression systems. The methods and procedures disclosed in the current application can be executed or preformed in a computer, other microprocessors, programmable electronic devices or other electronic circuitry that are used for encoding images. They can be loaded into the above devices as software, hardware, or firmware. They can be implemented and programmed as discrete operations or as a part of a larger image compression strategy.

INDUSTRIAL APPLICABILITY

In compliance with the statute, the invention has been described in language more or less specific as to structural features. It is to be understood, however, that the invention is not limited to the specific features shown or described, since the means and construction shown or described comprise preferred forms of putting the invention into effect. Additionally, while this invention is described in terms of being used to provide a method of compressing still images in multi-purpose compression systems, it will be readily apparent to those skilled in the art that the invention can be adapted to other uses as well. The invention should not be construed as being limited to image compression and is therefore, claimed in any of its forms or modifications within the legitimate and valid scope of the appended claims, appropriately interpreted in accordance with the doctrine of equivalents.

What is claimed is:

1. A method for compressing electronically stored still images in a multi purpose compression system comprising the step of:
   a. selecting the image to be compressed;
   b. converting any selected image that is in the RGB format into the YUV 4:4:4 format;
   c. converting images in the YUV 4:4:4 format into the YUV 4:2:0 format
   d. combining the U and V color planes;
   e. executing a one-dimensional discrete wavelet transform for every line of the Y plane such that two blocks with multiple rows and columns are formed wherein one block contains low frequencies and the other block contains high frequencies;
   f. executing a one-dimensional discrete wavelet transform for every line of the plane obtained after the preceding step such that the blocks in the obtained frame are further divided into two blocks with multiple rows and columns, wherein the block containing low frequencies is divided into an LL block having low frequencies across and up and an LH block having low frequencies across and high frequencies up, and the block containing high frequencies is divided into an HH block having high frequencies across and up and an HL block having high frequencies across and low frequencies up;
   g. executing steps e and f for the obtained LL block and for each subsequent LL block four more such that the resulting plane contains sixteen variously sized blocks;
   h. numbering the blocks in the resulting plane according to a pre-determined numbering scheme;
   i. repeating steps e through h for the UV plane;
   j. selecting a filter from a library of possible filters wherein the filter selection is based on the image dimensions and the coding format;
   k. executing vertical and horizontal filtering passes on the blocks in the transformed Y and UV planes according to a pre-determined filtering scheme to obtain the frequency coefficient for each element in the transformed planes;
   l. quantizing the frequency coefficients and recording the quantized values into a one-dimensional array;
   m. quantizing the one-dimensional array by modified run length encoding such that a data array and a length array are obtained;
   n. replacing the values in the data array with a corresponding value in a pre-designated library of corresponding values wherein if no corresponding value exists in the library for an element in the data array, a one element shift is executed and the library is rechecked for a corresponding value;
   o. recording the relative displacement of elements in the length array having a value higher than a pre-determined number to an additional array called the shift array;
   p. writing the shift array to the end of the length array;
   q. encoding the length array and the data array using entropy encoding methods; and
whereby the image can be restored by reversing the steps a through q above.

* * * * *